United States Patent

[11] 3,579,841

[72] Inventor Dana Peterson
    P.O. Box 412, Coronado, Calif. 92118
[21] Appl. No. 4,435
[22] Filed Feb. 2, 1970
[45] Patented May 25, 1971
    Continuation of application Ser. No.
    752,695, Aug. 14, 1968, now abandoned.

[54] PROTRACTOR
    2 Claims, 3 Drawing Figs.
[52] U.S. Cl. .................................................. 33/75
[51] Int. Cl. ........................................... B43l 13/00
[50] Field of Search ................................. 33/75, 1

[56] References Cited
UNITED STATES PATENTS

| | | | |
|---|---|---|---|
| 85,991 | 1/1869 | Briggs............................ | 33/75 |
| 413,497 | 10/1889 | De Puy........................... | 33/75 |
| 1,398,323 | 11/1921 | Freyder.......................... | 33/75 |
| 1,774,731 | 9/1930 | Sjobring......................... | 33/75 |
| 2,424,065 | 7/1947 | Stewart.......................... | 33/1(N) |

Primary Examiner—Harry N. Haroian

ABSTRACT: A compact protractor having an outer transparent semicircularly shaped outer casing part and an opaque similarly shaped inner member snugly received therein for rotation. Openings and indicia are provided on the transparent outer casing.

PATENTED MAY 25 1971 3,579,841

INVENTOR.
DANA PETERSON
BY Dana Peterson

PROTRACTOR

This application is a continuation of Ser. No. 752,695 filed Aug. 14, 1968, now abandoned.

This invention is in combination a drawing instrument comprising operatively engaging sections in providing a plurality of surfaces for measuring angles and laying out angles when figured to a common baseline.

The primary object of my invention is to provide a compact, simple and accurate drawing instrument with means that may be used fast and accurately by students in geometry classes, architects and engineers in drawing layouts, carpenters, cabinet makers, loftsmen, sheet metal workers and others in associated trades.

Types of protractors in common use today do not include an inner section of means contained within the instrument body similar to my invention to provide immediate reading and scribing of a chosen angle.

Other types of protractors consist of a plurality of parts including a pivotal pin at the vertex point. An angle cannot be dawn to said point because the pin lies in the path of the scribing tool. My invention has eliminated the need for a pivotal pin thereby enabling the user to scribe an angle to a vertex point.

My improved drawing instrument includes two relatively movable semicircular members, the planar edge of one member cooperating with the planar edge of the other member to form an angle at the vortex of the members. Using my invention, I can scribe two segments of an angle meeting at the vortex point thereby achieving the desired result with less parts than most other protractors in use today and with less movements.

The present day manufactured simple protractor consists of one semicircular flat member of transparent high-impact plastic having an indicia scale thereon including a straight angle indicia and a common pencil lead-sized aperture through the flat member midway in said straight angle indicia providing means to scribe a vertex point on a baseline. To use this instrument now in common use, one must scribe a baseline along the planar edge, move the instrument so that the indicia straight angle mark falls on said baseline; the vertex aperture is positioned, a pencil point through said aperture marks the point desired, another desired point of the angle is marked at the indicia degree mark on the peripheral edge of said protractor; this instrument is moved again wherein the planar edge lies along the two scribed points; the second segment is drawn to form the angle.

My invention is easier to use, requires less movements, achieves the same objective and is accurate. It is comprised of two semicircular flat members of transparent high impact plastic having indicia scales thereon, joined at the peripheral edges, spaced apart and parallel, open at the bottom planar edge to form a pocket within which a movable member having the same general configuration as the outer member and of opaque high-impact plastic may fit snugly and when manipulated may ride accurately on the inner bearing surface of the main body and maintain a true center at the vertex point of the desired angles. Further, the planar edges of the outer member cut through the zero degree indicia numbers on both faces. Said faces are provided with apertures to enable finger manipulation of the inner member. When said movable inner member is positioned correctly within the instrument body of my invention, it can be manipulated to provide desired angles, the vertex occuring at the juncture of the planar edge of said inner member and the planar edges of the instrument body. The transparent, semicircular, indicia scaled faces of my protractor enable the user to read the angle formed when the planar edge of opaque inner member is positioned beneath the degree indicia number showing on the drawing instrument face. The two faces of my drawing instrument enable the user to read, adjust and scribe angles below and above the baseline when figured to a common baseline; the indicia numbers on one face of my protractor are upright and indicia numbers on the reverse face of said protractor are upside down. The reason for the opposite direction of the indicia numbers is as follows: the instrument is inverted depending upon the desired position for scribing or reading the angle above or below the baseline.

Together with its objects and advantages, my invention will be best understood from a study of the following description with the accompanying drawings wherein.

Figure 1:
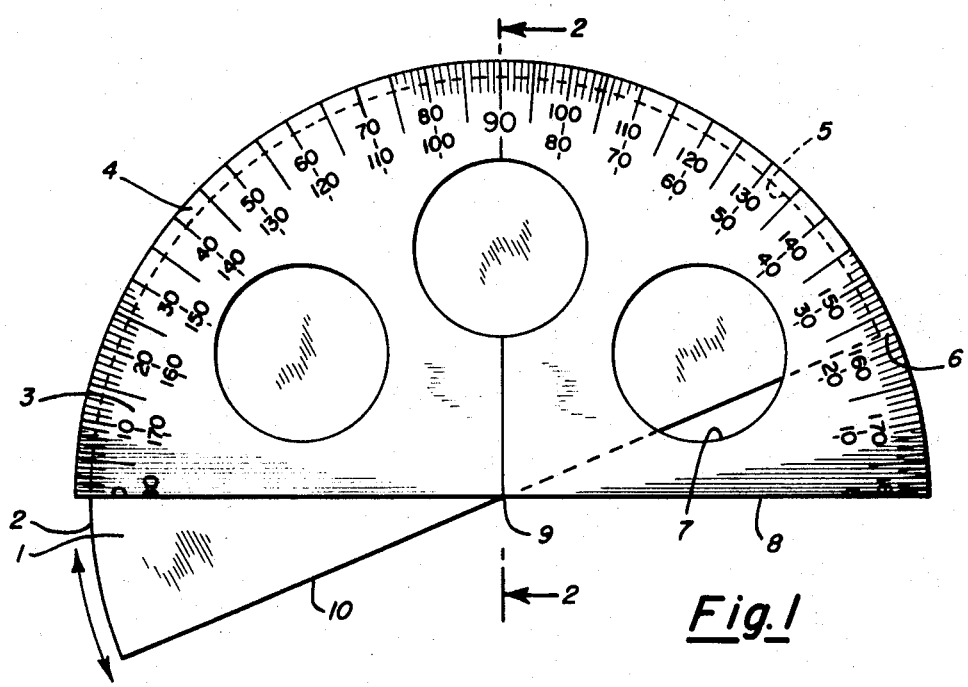
FIG. 1 is a front elevational view of the protractor in open position providing an angle of 157½°, the vertex point of the angle on line 2–2.
Figures 2, 3:
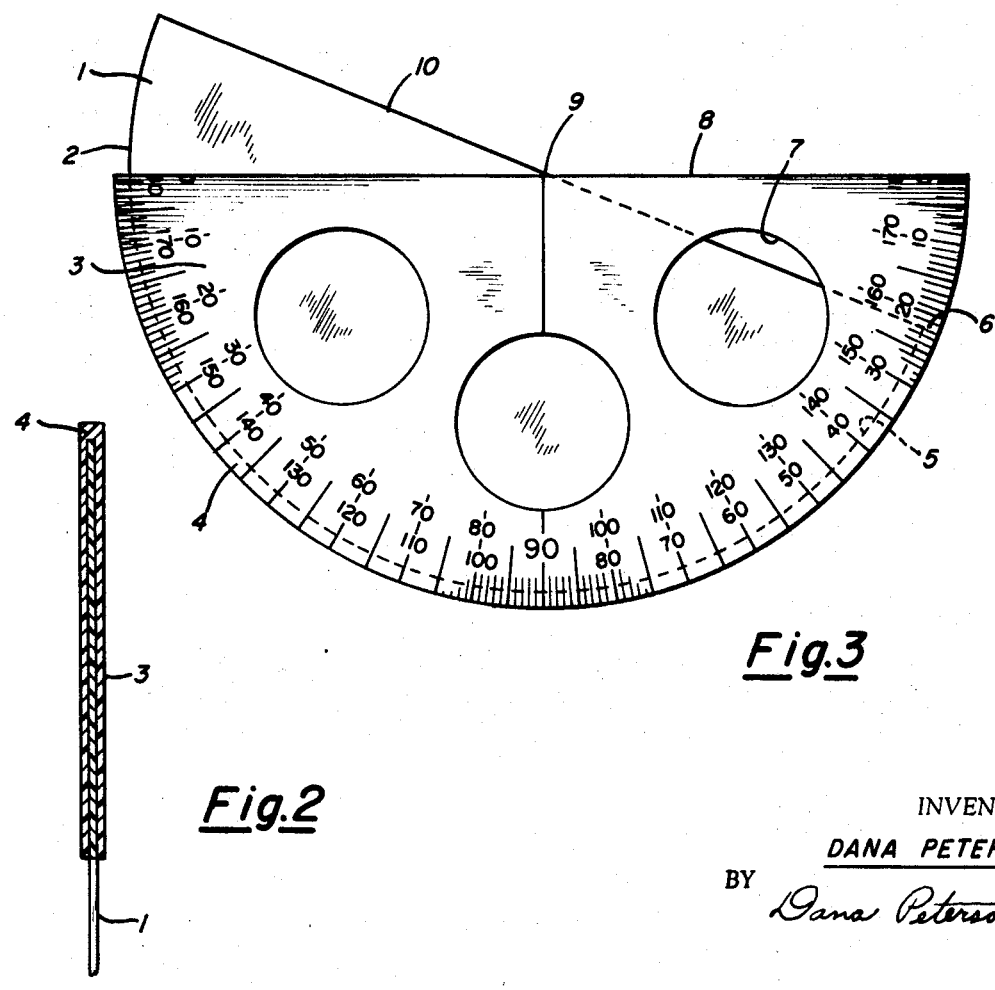
FIG. 2 is a cross section view of the invention showing the inner member within the instrument body.
FIG. 3 is an elevational view of the protractor in an open and inverted position providing an angle of 157½°.

In FIGS. 1 thru 3, 1 indicates an opaque, generally semicircular inner member having spaced parallel uninterrupted planar faces, 3 indicates a generally semicircular body member formed of spaced parallel sections each of said sections having spaced parallel uninterrupted planar faces, 4 the peripheral section joining the parallel section of each body member, 5 the bearing surface of section 4 upon which rides 2 the peripheral edge of 1 the inner member, 6 the indicia reference numbers on the outer face of body member 3, 7 shows one of six apertures allowing finger manipulation of 1 the inner member. Numeral 9 indicates the vertex point of the angles shown.

To use my invention for scribing angles figured to a common baseline, the drawing instrument body 3 having the inner member 1 within it, is placed so the planar uninterrupted diametral edge 8 of said instrument body 3 coincides with the baseline; the inner member 1 is adjusted by using finger means thru aperture 7 allowing peripheral edge 2 of inner member 1 to fit snugly on bearing surface 5 of instrument body 3. The user of this instrument now scribes along the inner planar edge 10 and along outer planar edge 8 to produce the desired angle.

To use my invention for reading angles of solid forms having flat surfaces, the protractor body 3 having inner member 1 within it, is placed in such a manner that part of planar edge 8 of said instrument body 3 butts against one surface of said solid form and inner member 1 is manipulated by finger means thru apertures 7 ascertaining peripheral edge 2 of inner member 1 to be positioned on bearing surface 5 of instrument body 3. The user of this instrument now moves inner member 1 in such manner that inner member planar edge 10 butts against the second plane of said solid form. The angle of measure may be read at the indicia number reference 6 at a point where planar edge 10 lies beneath the indicia number and mark.

I claim:

1. A protractor comprising, a semicircular outer member consisting of closely spaced parallel sections, each of said sections have planer faces with aligned semicircular outer edges and uninterrupted diameter planer edges, a semicircular wall joining said sections at their circumferential edges forming a narrow pocket defined by the inner planer surfaces of said sections and said wall, which pocket is open along said diameter planer edges, a semicircular inner planer member for fitting in said pocket with the outer circular edge slidably engaging the inner surface of said wall and with the uninterrupted diameter planer edge of said inner member positioned in the same plane of the diameter planer edges of said outer member, said outer member having indicia means adjacent its outer circumferential edge, and said inner and outer members are relatively movable with the outer circular edge of said inner member abutting the inner surface of said wall to provide varying angles between said edges, which angles are readable through alignment of one end of the planer edge of said inner member and said indicia means wherein said outer member is formed of transparent material and said inner member is formed of opaque material and at least one of said sections having openings there through, through which said inner member may be actuated when completely positioned in said pocket.

2. A protractor as claimed in claim 1 in which, said indicia means comprises indicia on one of said sections that is upright in the radially inward direction and indicia on the other of said sections that is upright in the radially outward direction.